United States Patent [19]
Hardt et al.

[11] Patent Number: 6,129,429
[45] Date of Patent: Oct. 10, 2000

[54] RACK SERVICEABLE COMPUTER CHASSIS ASSEMBLY

[75] Inventors: Thomas T. Hardt, Missouri City; Joseph R. Allen, Tomball; Bonnie E. Prichep, Houston; Karl J. Dobler, Cypress, all of Tex.

[73] Assignee: Compaq Computer Corporation, Houston, Tex.

[21] Appl. No.: 09/249,374

[22] Filed: Feb. 12, 1999

[51] Int. Cl.[7] .................................................. A47B 81/06
[52] U.S. Cl. .................... 312/223.2; 312/290; 361/326
[58] Field of Search .................... 312/223.2, 223.1, 312/330.1, 290; 220/315, 345, 346; 361/726, 725, 727

[56] References Cited

U.S. PATENT DOCUMENTS

| | | | |
|---|---|---|---|
| 5,121,296 | 6/1992 | Hsu | 361/391 |
| 5,162,976 | 11/1992 | Moore et al. | 361/391 |
| 5,397,176 | 3/1995 | Allen et al. | 312/223.2 |
| 5,491,611 | 2/1996 | Steward et al. | 312/223.2 |
| 5,867,369 | 2/1999 | Antonuccio et al. | 312/223.2 |

*Primary Examiner*—Peter M. Cuomo
*Assistant Examiner*—Jerry A. Anderson

[57] ABSTRACT

A rack serviceable computer chassis for housing multiple computer modules. A rectilinear housing receives at least one module containing electrical components associated with a computer system which includes a planar right panel, a planar left panel, a planar bottom panel, a stationary planar top panel for covering non-rack serviceable components, and a sliding top panel integral to the housing for effectuating access to the at least one module and electrical components. The sliding top panel is located above the stationary top panel while in an open position. The rack serviceable chassis further includes a means for sliding the sliding top panel between the open position and a closed position, a means for supporting the sliding top panel while in the closed position, and a means for transitioning the sliding top panel between the open position and the closed position.

17 Claims, 6 Drawing Sheets

RACK SERVICEABLE COMPUTER CHASSIS ASSEMBLY

FIELD OF THE INVENTION

The present invention relates to a computer chassis, and more particularly, but not by way of limitation, to a rack mountable computer chassis constructed to allow easy servicing of multiple modular components housed within the chassis while the computer chassis remains mounted to the rack.

BACKGROUND OF THE INVENTION

Early computer designs generally included a chassis with a plurality of individual components and assemblies mounted therein and connected to one another by means of wires, cables, brackets, nuts, bolts and the like. A major computer design advance occurred with the advent of printed circuit boards, integrated circuits and modular component assemblies. The printed circuit boards were, for example, formed of lightweight material and housed a myriad of components which were electrically interconnected with the component assemblies through wiring harnesses. The wiring harnesses and hard wire connections were subsequently replaced by technologically advanced connectors used for integrally coupling the individual components to each other and to other circuitry in the computer.

In the design of electronic equipment, the use of connectors, modular components, and specialized hardware has permitted key components and printed circuit boards to be efficiently added and removed. Such ease in the addition and deletion of computer components and printed circuit boards has facilitated assembly repair, upgrade, and/or changes in functionality.

Computer reliability and serviceability are also valuable design aspects. Originally, a rule of practice in the maintenance of electrical circuitry, such as computer hardware, was that of always turning the power to the computer off before components or printed circuit boards were added or removed from the computer chassis or support frame. Recent innovations have addressed the desirability to insert and remove modular components and printed cards from electrical equipment, such as computer hardware, when the computer is electrically connected and operational, i.e. "hot." This is now possible for hot plugable hard drives, and in these cases, the power may be disconnected from only the connector of the drive to be inserted and removed while allowing the adjacent components to remain "hot."

Removable computer components today include disc drives, drive cages, fans, power supplies, system I/O modules, processor boards, and other subassemblies. As referenced above, the removability of computer components allows for better overall serviceability of the computer system, which is a distinct advantage to both the user and the maintenance technician. A defective power supply in the main or central computer generally requires prompt replacement in order to limit downtime. It is for this reason that modular components and connectors facilitate prompt replacement and are thus popular in many computer designs.

The modularity of computer systems is thus recognized as an important design consideration. As referenced above, modules can be removed and examined for operability or other purposes much easier than permanently mounted fixtures within a computer chassis. Because computers provide an integral part of most business operations, it is of utmost importance to maintain the reliability and integrity of the computer system. When the various elements of a computer can be easily removed in a modular form, they can also be replaced to maintain the operational status of the computer.

Despite the advantages of allowing electrical components of a computer system to be hot plugable there are certain concerns and potential problems associated with hot plugable computer systems. Frequently, hot plugable computer systems are housed within a computer chassis and rack mounted into a frame on sliding rollers which allow the computer chassis to be pulled out of the rack frame and exposed. When the system is to be serviced, the chassis is pulled from the rack frame and a top cover panel is removed to expose the modules and associated components. The removal of the top cover panel can create various problems. First, the removed panel must be put aside and risks being lost, bent or otherwise damaged. Second, the removal of the top cover panel exposes all the modules and components housed within the computer chassis. In certain situations there may be modules or components which are not hot plugable and are best left covered and protected during a servicing operation. Third, cooling of the modules and components within the computer chassis are increasingly dependent on specifically calculated air flows which are contingent on the presence of the top cover panel. There may be components having cooling needs which require the presence of the top cover panel even during the servicing operation and are therefore, best left covered during the servicing operation. Furthermore, there is a risk that the computer chassis will be slid back into the rack frame without the top cover panel being replaced, especially if the panel was damaged or lost during the servicing operation, thereby preventing proper cooling of the computer system.

It would be advantageous, therefore, to devise a rack mountable computer chassis which allows access to hot plugable modules and components for their servicing while at the same time covering other modules or components which require protection during the servicing operation. It would further be advantageous if such a chassis allowed access to the hot serviceable modules and components while at the same time maintaining the top cover panel as an integral part of the computer chassis during the servicing operation. It would still further be advantageous if such a chassis prevented the chassis from being slid back into a rack frame without the top cover panel being replaced.

SUMMARY OF THE INVENTION

The present invention overcomes the above identified problems as well as other shortcomings and deficiencies of existing technologies by providing a rack serviceable computer chassis for housing multiple computer modules. The rack serviceable computer chassis comprises a rectilinear housing which receives at least one module containing electrical components associated with a computer system, which housing includes a planar right panel, a planar left panel, a planar bottom panel, and a stationary planar top panel for covering non-rack serviceable component. The chassis also includes a sliding top panel integral to the housing for effectuating access to the at least one module and electrical components. The sliding top panel is located above the stationary top panel while in an open position. The rack serviceable chassis further includes a means for sliding the sliding top panel between the open position and a closed position, a means for supporting the sliding top panel while in the closed position, and a means for transitioning the sliding top panel between the open position and the closed position.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
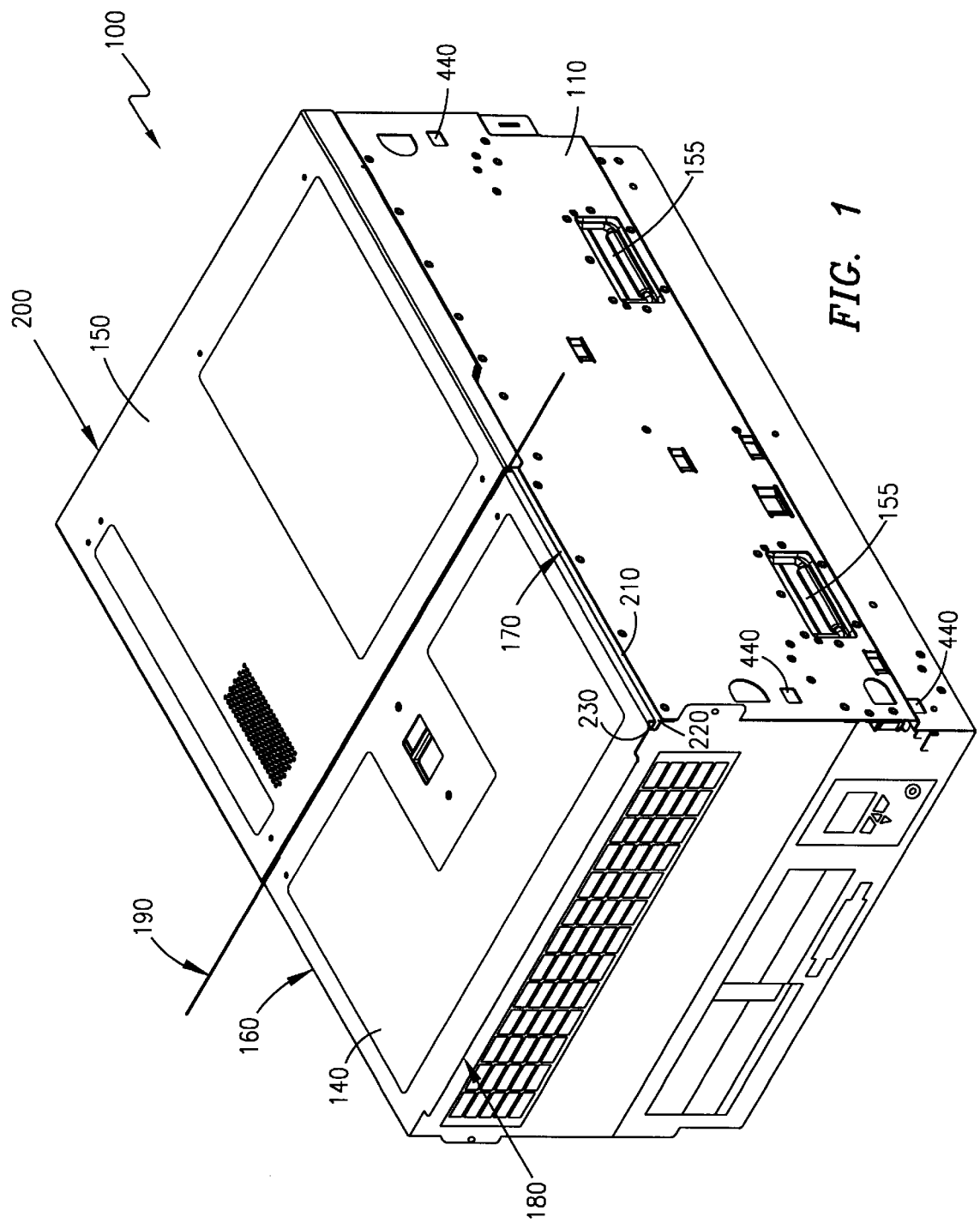
FIG. 1 is a top, front, right perspective view of a computer chassis, with a sliding top panel in a closed position, constructed in accordance with the present invention.
Figure 2A:
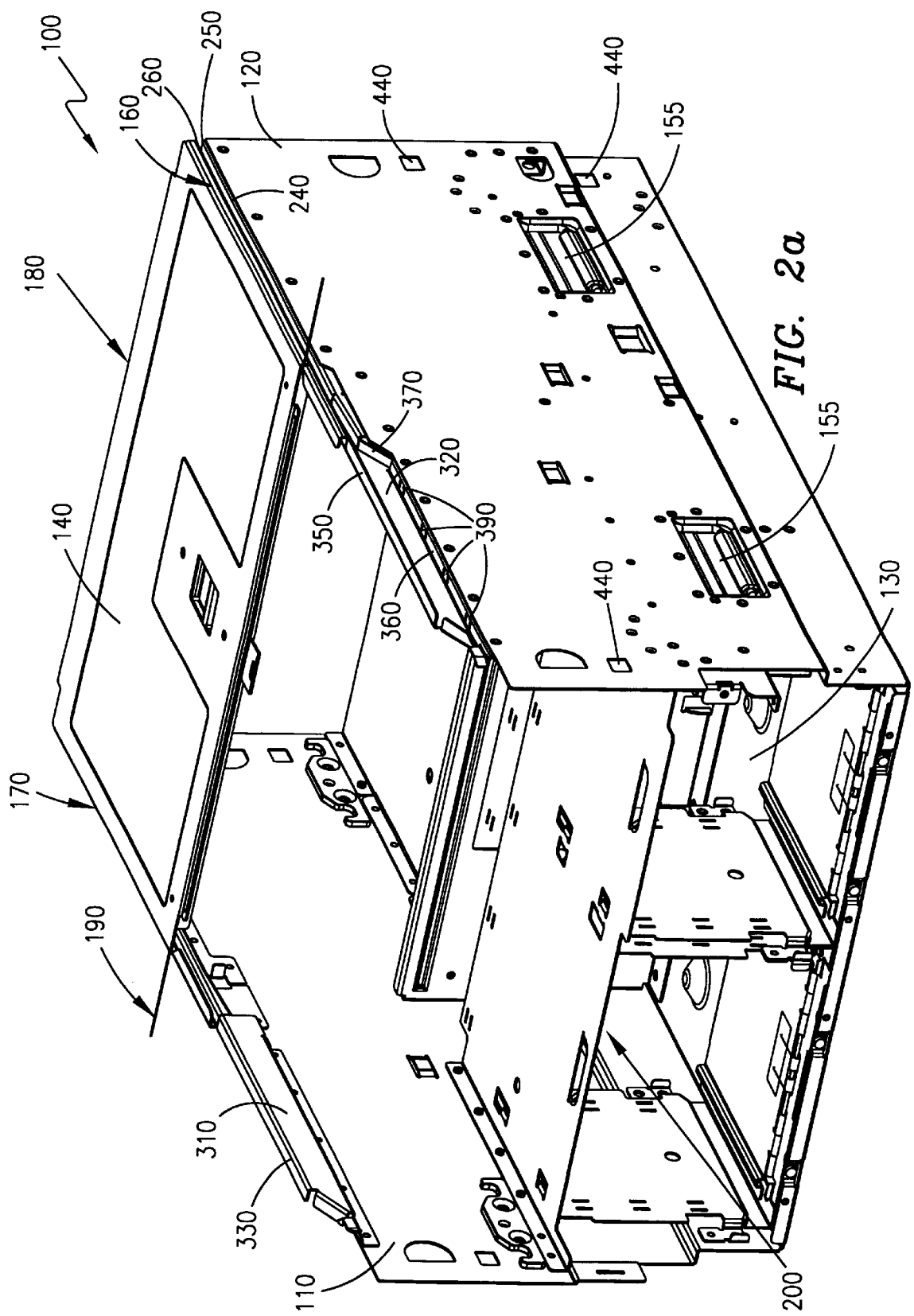
FIG. 2A is a top, rear, left perspective view of the computer chassis, with the sliding top panel removed, constructed in accordance with the present invention.
Figure 2B:
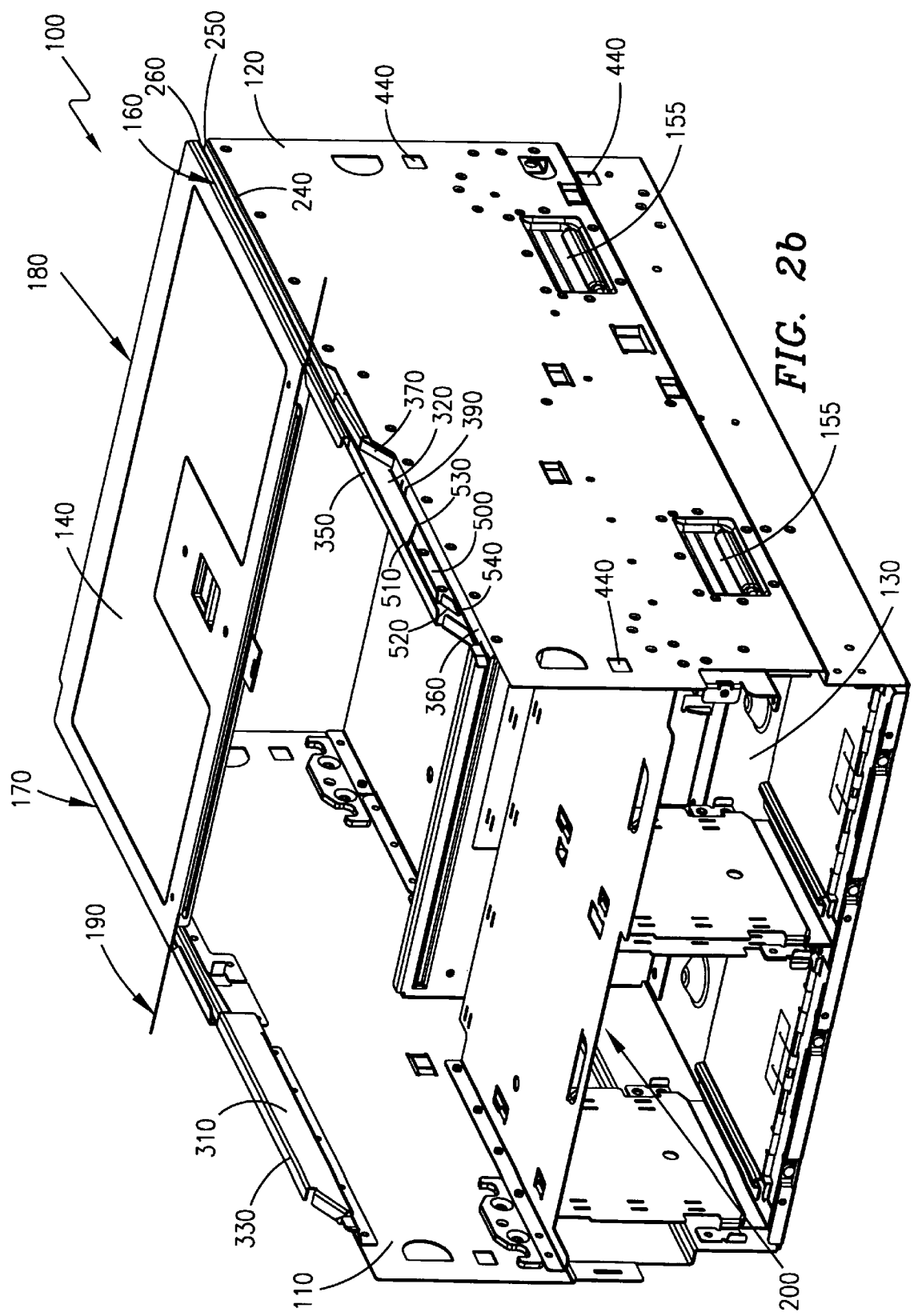
FIG. 2B is the top, rear, left perspective view of the computer chassis depicted if FIG. 2A, further including a channel guide, constructed in accordance with the present invention.
Figure 3:
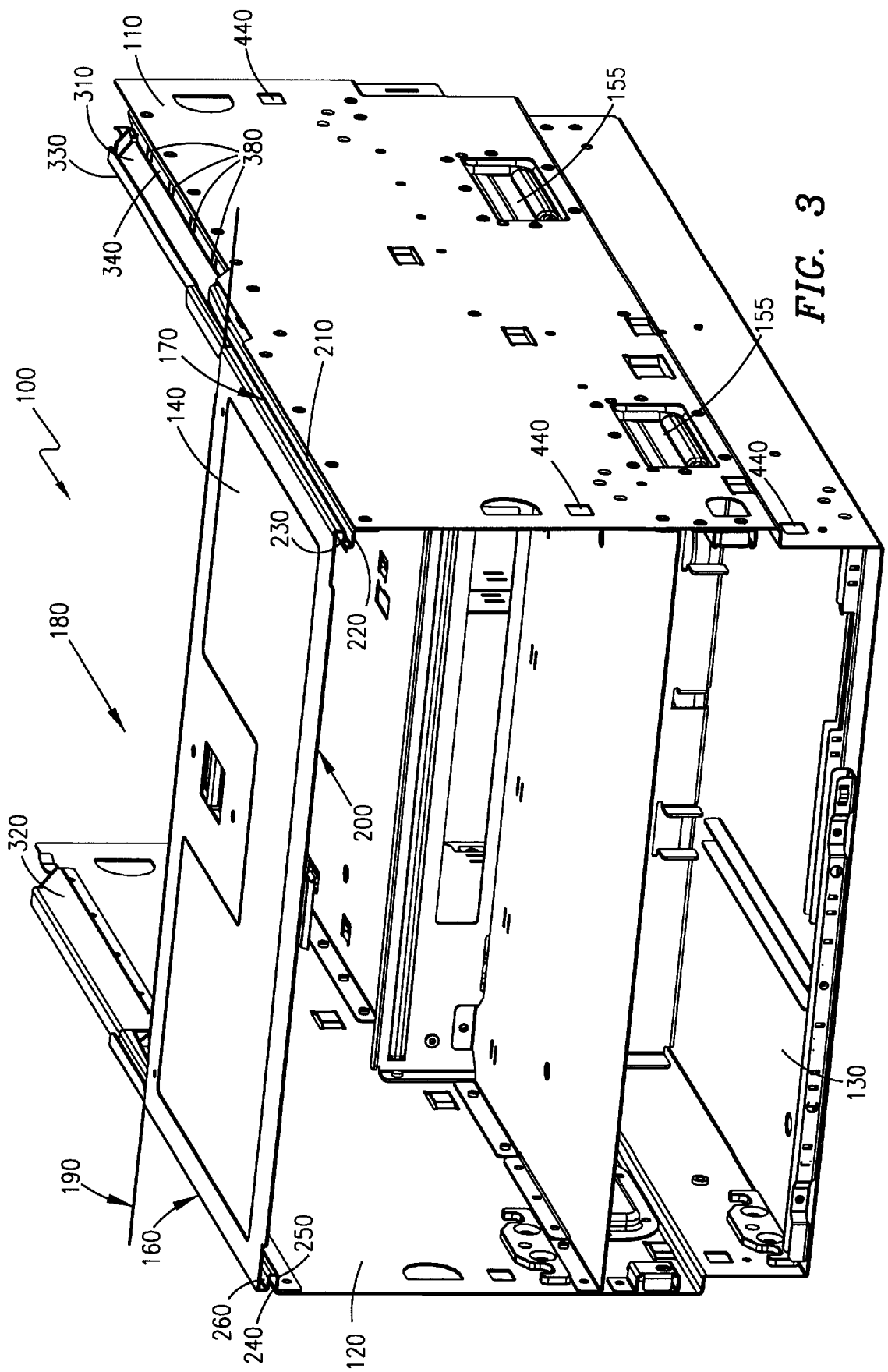
FIG. 3 is a top, front, right perspective view of the computer chassis, with the sliding top panel removed, constructed in accordance with the present invention.

Referring now to the drawings wherein like or similar elements are designated with identical reference numerals throughout the several views, and wherein the various elements depicted are not necessarily drawn to scale, and in particular, to FIGS. 1–3, there is illustrated three perspective views of the computer chassis, shown generally at 100, constructed in accordance with the present invention. The computer chassis 100 includes a rectilinear housing constructed of a planar right panel 110, a planar left panel 120, a planar bottom panel 130, a stationary planar top panel 140, an integral sliding top panel 150 and a plurality of recessed handles 155, the recessed handles located on the right panel 110 and the left panel 120. The plurality of recessed handles 155 can be any type including a fixed contoured handle grip or a swinging bar handle grip. The stationary top panel 140 extends from a top edge 160 of the left panel 120 to a top edge 170 of the right panel 110 and from a front side 180 of the housing to a central line 190. The central line 190 is parallel to the front side 180 of the housing and defines a set of points located in between the front side 180 of the housing and a rear side 200 of the housing. The location of the central line 190 can be at any location between the front side 180 and the rear side 200 of the housing; however, in the present invention, the central line 190 is positioned such that modules and electrical components which are not to be rack serviceable are covered by the stationary top panel 140, while modules and electrical components which are to be rack serviceable are covered by the stationary top panel 150 which is slid open to expose the modules and electrical components.

The right panel 10 includes an indented right channel 210 formed into the stationary top panel 140 and extends the length of the stationary top panel 140. The right channel 210 includes a right lower edge 220 and a right upper edge 230. Similarly, the left panel 120 includes an indented left channel 240 formed into the left panel 120 below the top edge 160 of the left panel 120 extending the length of the stationary top panel 140. The left channel 240 includes a left lower edge 250 and a left upper edge 260.

Figure 4:
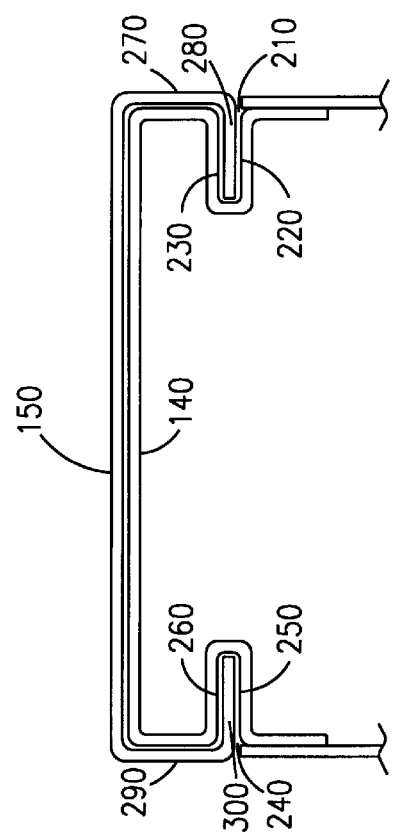
FIG. 4 is a front cross sectional view of the stationary top panel and an upper housing portion of the computer chassis constructed in accordance with the present invention.

Referring additionally now to FIG. 4, there is illustrated a front cross sectional view of the stationary top panel 140 and the upper housing portion of the computer chassis 100 constructed in accordance with the present invention. The sliding top panel 150 includes a right support member 270 attached to a right side of the sliding top panel 150 and a right lip 280 which fits into the right channel 210. The right support member 270 and right lip 280 extend along a right side of the sliding top panel 150. Similarly, the sliding top panel 150 includes a left support member 290 attached to a left side of the sliding top panel 150 and a left lip 300 which fits into the left channel 240 The left support member 290 and left lip 300 extend along a left side of the sliding top panel 150.

The right lip 280 mates with the right channel 210 and the left lip 300 mates with the left channel 240 so as to effectuate a means for sliding the sliding top panel 150 laterally between the front side 180 and the rear side 200 thereby moving the sliding top panel 150 between an open and closed position. Although a perspective view of the computer chassis 100 with the sliding top panel 150 in the open position is not shown, it is understood from FIG. 4, that in the open position, the sliding top panel 150 is located, and slides above the stationary top panel 140. With the sliding top panel 150 in the open position above the stationary top panel 140, the height of the computer chassis 100 is increased sufficiently such that the computer chassis 100 is too large to slide into its opening in the rack frame. This prevents the computer chassis 100 from being slid back into the rack frame without the sliding top panel 150 in the closed position.

The right lip 280 and left lip 300 rest on top of the right lower edge 220 and the left lower edge 250 respectively to support the sliding top panel 150 above the top stationary panel 140 while in an open position. Similarly, the right upper edge 230 and the left upper edge 260 prevent the lifting and removal of the sliding top panel 150 while in the open position.

To support the sliding top panel 150 while in the closed position, the computer chassis 100 includes a right support bracket 310 located in a cutaway portion of the right panel 110 and a left support bracket 320 located in a cutaway portion of the left panel 120. The right support bracket 310 includes a right upper rail 330 and a right lower rail 340. The right upper rail 330 extends from the right upper edge 230 of the right channel 210 along a portion of the top side of the housing. The right lower rail 340 is located below, and parallel to, the right upper rail 330 along a portion of the right panel 110 and is attached to the right panel 110. The right lower rail 340 and the right lower edge 220 of the right channel 210 are joined with an angled right transition member (not shown but identical to a left transition member 370 depicted in FIG. 2). As the sliding top panel 150 is slid into the closed position, the right lip 210 slides off the right lower edge 220, down the right transition member and onto the right lower rail 340 into the closed position.

The left support bracket 320 includes a left upper rail 350 and a left lower rail 360. The left upper rail 350 extends from the left upper edge 260 of the left channel 240 along a portion of the top side of the housing. The left lower rail 360 is located below, and parallel to, the left upper rail 350 along a portion of the left panel 120 and is attached to the left panel 120. The left lower rail 360 and the left lower edge 250 of the left channel 240 are joined with the angled left transition member 370. As the sliding top panel 150 is slid into the closed position, the left lip 300 slides off the left lower edge 250, down the left transition member 370 and onto the left lower rail 360 into the closed position.

In an alternative embodiment, the left support bracket 320 includes a left channel guide 500 which extends along the left panel 120 between a first left point 530 and a second left point 540. A first left channel guide transition member 510 joins the left lower rail 360 to the top of the left channel guide 500 near the first left point 530 and a second left channel guide transition member 540 joins the top of the left channel guide 500 to the left lower rail 360 near the second left point 540. Furthermore, a portion of the left lip 300 of the sliding top panel 150 which extends from the first left point 530 to the second left point 540 while the sliding top panel 150 is in the closed position is cut away. Similarly a corresponding right channel guide (not shown) extends along the right panel 110 between a first right point and a second right point. A first right channel guide transition member joins the right lower rail 340 to the top of the right channel guide near the first right point and a second right channel guide transition member joins the top of the right channel guide to the right lower rail 340 near the second right point. Furthermore, a portion of the right lip 280 of the sliding top panel 150 which extends from the first right point to the second right point while the sliding top panel 150 is in the closed position is cut away.

In the alternative embodiment, as the sliding top panel 150 is slid into the closed position, the left lip 300 and right lip 280 gradually slide off the left lower edge 250 and the right lower edge 220 respectively. When a rear edge of the left lip 300 and a rear edge of the right lip 280 encounter the left channel guide 500 and the right channel guide respectively, the rear edge of the left lip 300 and the rear edge of the right lip 280 slide up the first left channel guide transition member 510 and the first right channel guide transition member respectively. As the sliding top panel 150 is further slide to the closed position, the left channel guide 500 and the right channel guide support the sliding top panel 150 until the cut away portion of the left lip 300 and the cut away portion of the right lip 280 allow the left lip 300 and the right lip 280 to slide down the second left transition member 520 and the second right transition member respectively into the closed position.

In order to ground the sliding top panel 150, a plurality of right grounding tabs 380 are attached to the right lower rail 340 and a plurality of left grounding tabs 390 are attached to the left lower rail 360. The plurality of right grounding tabs 380 and left grounding tabs 390 are electrically connected to ground and make electrical connection with the sliding top panel 150 thereby grounding the sliding top panel 150. The plurality of right grounding tabs 380 and left grounding tabs 390 are constructed of a flexible electrically conductive material which is normally biased away from the right lower rail 340 and the left lower rail 360 respectively.

Figure 5:
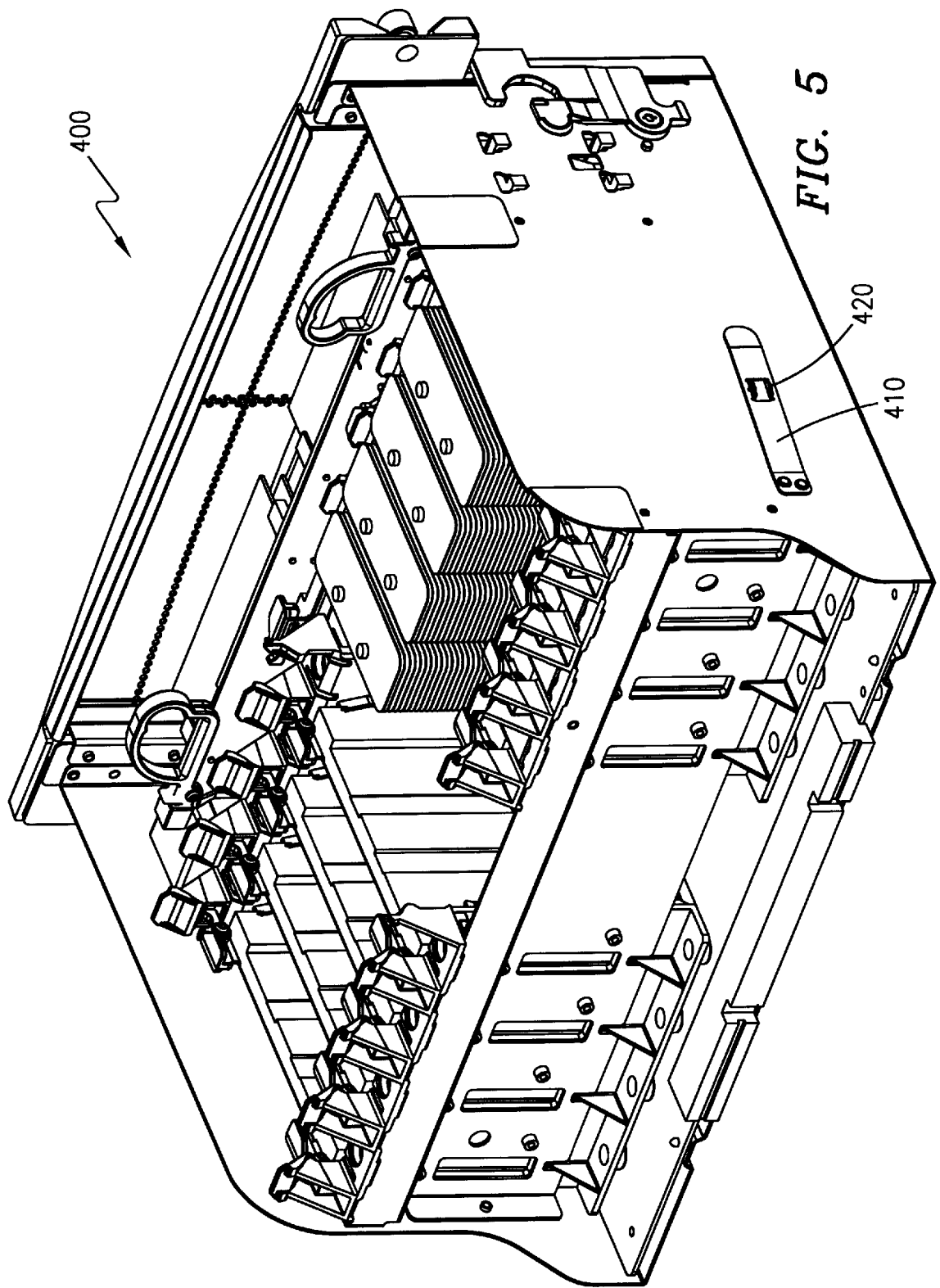
FIG. 5 is a top, rear, left perspective view of a computer module and a module stop constructed in accordance with the present invention.

Referring additionally now to FIG. 5, there is illustrated a top, rear, left perspective view of a computer module, shown generally at 400, and a module stop constructed in accordance with the present invention. The computer module 400 includes a left module stop attached to a left side of the computer module 400 and a right module stop attached to a right side of the computer module 400. Although the right module stop and right side of the computer module 400 are not shown, it is understood that they are constructed in a manner identical to the left module stop and the left side of the computer module 400.

Figure 6:
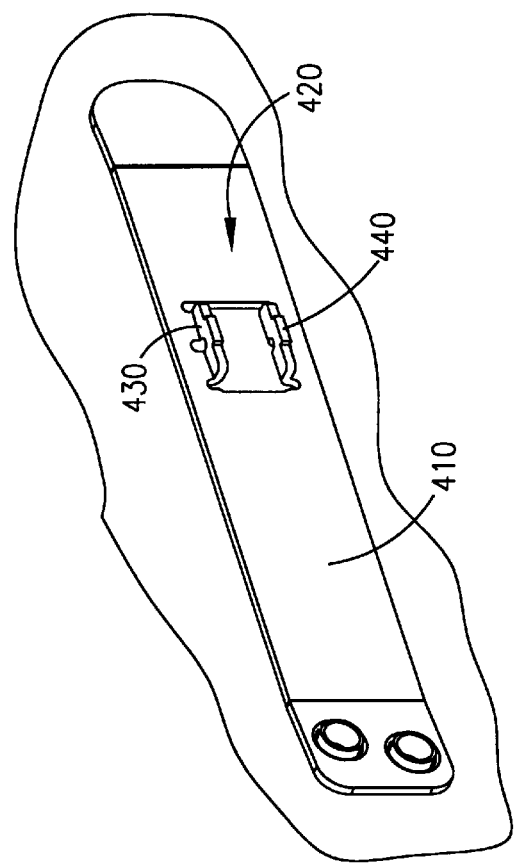

The right module stop and left module stop each include a flexible metal strip 410 attached to, and normally biased away from, the right side and left side of the computer module 400 respectively. The right module stop and left module stop each further include an embossment 420 which protrudes away from the flexible metal strip 410 in a direction away from the computer module 400. While the embossment 420 can be formed in any manner, in the present invention, the embossment 420 is formed by cutting away a portion of the metal strip 410 and bending a top portion 430 and a bottom portion 440 outward away from the computer module 400 at a ninety degree angle to the metal strip 410 to create the protrusions depicted in FIG. 6. Alternatively, the embossment 420 can be formed by cutting a slit across a portion of the width of the flexible metal strip 410 and forcing the metal on one edge of the slit outward away from the computer module 400 to create the embossment 420 on the flexible metal strip 410. Using any method to create the embossment 420, the computer module 400 is slid out of the computer chassis 100 and the embossments 420 on the left and right side of the computer module 400 "catch" on the appropriately aligned catch cutaways 440 (see FIGS. 1–3) located on the right panel 110 and the left panel 120 thereby preventing further sliding of the computer module 400 out of the chassis 100. A user must then push in the embossments 420 on the left and right side of the computer module 400 in order to slide the computer module the rest of the way out of the chassis 100.

Based on the foregoing, it should now be understood and appreciated that the present invention provides numerous advantages, including a rack mountable computer chassis which allows access to hot plugable modules and components while at the same time covering other modules or components which require protection during a servicing operation. The present invention further allows access to the hot serviceable modules and components while at the same time maintaining a top cover panel as an integral part of the computer chassis during the servicing operation. The present invention still further prevents the chassis from being slid back into a rack frame without the top cover panel being replaced.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A rack serviceable computer chassis comprising:

a rectilinear housing for receiving at least one module containing electrical components associated with a computer system, the housing having a planar right panel, a planar left panel, a planar bottom panel and a stationary planar top panel, the stationary top panel located on a top side of the housing extending from a top edge of the left panel to a top edge of the right panel and from a front side of the housing to a central line parallel to the front side of the housing and extending from a point located between the front side of the housing and a rear side of the housing running from the top edge of the left panel to the top edge of the right panel, the housing further adapted for rack mounting use;

a sliding top panel integral to the housing, the sliding top panel extending from the rear side of the housing to the central line while in a closed position and extending from the central line to the front side of the housing and located above the stationary top panel while in an open position, the sliding top panel effectuating access to the at least one module and electrical components;

means for sliding the sliding top panel between the open position and the closed position;

means for supporting the sliding top panel while in the closed position; and means for transitioning the sliding top panel between the open position and the closed position.

2. The computer chassis, as recited in claim 1, wherein the means for sliding the sliding top panel between the open position and the closed position comprises:

an indented right channel formed into the right panel located below the top edge of the right panel and extending a length of the stationary top panel;

an indented left channel formed into the left panel located below the top edge of the left panel and extending a length of the stationary top panel;

a right support member attached to a right side of the sliding top panel extending in a perpendicular direction downward from the sliding top panel;

a right lip extending from the right support member into the right channel, the right lip for mating the right support member to the right channel to effectuate lateral movement of the sliding top panel between the open position and the closed position;

a left support member attached to a left side of the sliding top panel extending in a perpendicular direction downward from the sliding top panel; and a left lip extending from the left support member into the left channel, the left lip for mating the left support member to the left channel to effectuated lateral movement of the sliding top panel between the open position and the closed position.

3. The computer chassis, as recited in claim 2, wherein the means for supporting the sliding top panel while in the closed position comprises:

a right support bracket located in a cutaway portion of the right panel, the cutaway portion located at the top edge of the right panel and extending from the center line to the rear side of the housing; and a left support bracket located in a cutaway portion of the left panel, the cutaway portion located at the top edge of the left panel and extending from the center line to the rear side of the housing.

4. The computer chassis, as recited in claim 3, wherein the right support bracket comprises:

a right upper rail extending from the lower right edge of the right channel along a portion of the top side of the housing for supporting the top panel while in the closed position;

a right lower rail located below and parallel to the right upper rail, the right lower rail extending along, and attached to, a portion of the right panel beneath the cutaway portion of the right panel.

5. The computer chassis, as recited in claim 4, wherein the left support bracket comprises:

a left upper rail extending from the stationary top panel along a portion of the top side of the housing for supporting the top panel while in the closed position;

a left lower rail located below and parallel to the left upper rail, the left lower rail extending along, and attached to, a portion of the left panel beneath the cutaway portion of the left panel.

6. The computer chassis, as recited in claim 5, wherein the means for transitioning the sliding the top panel between the open position and the closed position comprises:

a right transition member extending from a lower edge of the right channel to the right lower rail, the right transition member for supporting the right lip as the sliding top transitions from the open position to the closed position; and a left transition member extending from a lower edge of the left channel to the left lower rail, the left transition member for supporting the left lip as the sliding top transitions from the open position to the closed position.

7. The computer chassis, as recited in claim 6, further comprising:

a right channel guide for supporting a rear end of the right lip; and a left channel guide for supporting a rear end of the right lip.

8. The computer chassis, as recited in claim 7, further comprising:

a first right channel guide transition member for joining the right lower rail to a top of the right channel guide at a first right point;

a second right channel guide transition member for joining the top of the right channel guide to the right lower rail at a second right point;

a first left channel guide transition member for joining the left lower rail to a top of the left channel guide at a first left point; and a second left channel guide transition member for joining the top of the left channel guide to the left lower rail at a second left point.

9. The computer chassis, as recited in claim 6, further comprising:

a plurality of right grounding tabs for making electrical contact with the sliding top panel, the plurality of right grounding tabs attached to, and biased away from, the right lower rail, the plurality of right grounding tabs electrically connected to ground; and a plurality of left grounding tabs for making electrical contact with the sliding top panel, the plurality of left grounding tabs attached to, and biased away from, the left lower rail, the plurality of left grounding tabs electrically connected to ground.

10. The computer chassis, as recited in claim 9, further comprising:

a first plurality of recessed handles located on the right panel; and a second plurality of recessed handles located on the left panel.

11. The computer chassis, as recited in claim 10, wherein the first and the second plurality of recessed handles are fixed contoured handles.

12. The computer chassis, as recited in claim 10, wherein the first and the second plurality of recessed handles are swinging bar handles.

13. The computer chassis, as recited in claim 1, further comprising a means for preventing unintended removal of modules from the computer chassis.

14. The computer chassis, as recited in claim 13, wherein the means for preventing unintended removal of modules from the computer chassis comprises:

a right module stop attached to a right panel of the module;

a right catch cutaway located on the right panel of the computer chassis for catching the right module stop as the module is slid out of the computer chassis;

a left module stop attached to a left panel of the module; and a left catch cutaway located on the left panel of the computer chassis for catching the left module stop as the module is slid out of the computer chassis.

15. The computer chassis, as recited in claim 14, wherein the right and left module stops comprise:
- a flexible metal strip normally biased away from the module; and
- an embossment formed away from the module on the flexible metal strip, the embossment for catching in the catch cutaway and preventing the module from sliding out of the computer chassis.

16. A computer system comprising:
- a rectilinear housing for receiving at least one module containing electrical components associated with a computer system, the housing having a planar right panel, a planar left panel, a planar bottom panel and a stationary planar top panel, the stationary top panel located on a top side of the housing extending from a top edge of the left panel to a top edge of the right panel and from a front side of the housing to a central line parallel to the front side of the housing and extending from a point located between the front side of the housing and a rear side of the housing running from the top edge of the left panel to the top edge of the right panel, the housing further adapted for rack mounting use; and
- a sliding top panel integral to the housing, the sliding top panel extending from the rear side of the housing to the central line while in a closed position and extending from the central line to the front side of the housing and located above the stationary top panel while in an open position, the sliding top panel effectuating access to the at least one module and electrical components.

17. The computer system of claim 16, further comprising:
- an indented right channel formed into the right panel located below the top edge of the right panel and extending a length of the stationary top panel;
- an indented left channel formed into the left panel located below the top edge of the left panel and extending a length of the stationary top panel;
- a right support member attached to a right side of the sliding top panel extending in a perpendicular direction downward from the sliding top panel;
- a right lip extending from the right support member into the right channel, the right lip for mating the right support member to the right channel to effectuate lateral movement of the sliding top panel between the open position and the closed position;
- a left support member attached to a left side of the sliding top panel extending in a perpendicular direction downward from the sliding top panel; and
- a left lip extending from the left support member into the left channel, the left lip for mating the left support member to the left channel to effectuated lateral movement of the sliding top panel between the open position and the closed position;
- a right support bracket located in a cutaway portion of the right panel, the cutaway portion located at the top edge of the right panel and extending from the center line to the rear side of the housing, the right support bracket for supporting the sliding top panel while in the closed position; and
- a left support bracket located in a cutaway portion of the left panel, the cutaway portion located at the top edge of the left panel and extending from the center line to the rear side of the housing, the left support bracket for further supporting the sliding top panel while in the closed position.

* * * * *